United States Patent
Roy et al.

(10) Patent No.: US 11,313,720 B2
(45) Date of Patent: Apr. 26, 2022

(54) SYSTEM AND METHOD TO MINIMIZE NONRANDOM FIXED PATTERN NOISE IN SPECTROMETERS

(71) Applicant: Rigaku Raman Technologies, Inc., Wilmington, MA (US)

(72) Inventors: Eric Roy, Lexington, MA (US); Jason Booth, Boxford, MA (US); Claude Robotham, North Reading, MA (US); Federico Izzia, Burlington, MA (US)

(73) Assignee: Rigaku Raman Technologies, Inc., Wilmington, MA (US)

( * ) Notice: Subject to any disclaimer, the term of this patent is extended or adjusted under 35 U.S.C. 154(b) by 135 days.

(21) Appl. No.: 15/003,891

(22) Filed: Jan. 22, 2016

(65) Prior Publication Data

US 2016/0290864 A1 Oct. 6, 2016

Related U.S. Application Data

(60) Provisional application No. 62/106,970, filed on Jan. 23, 2015.

(51) Int. Cl.
*G01J 3/02* (2006.01)
*G01J 3/28* (2006.01)
(Continued)

(52) U.S. Cl.
CPC ............. *G01J 3/0297* (2013.01); *G01J 3/28* (2013.01); *G01J 3/2803* (2013.01); *G01J 3/44* (2013.01); *G01J 3/443* (2013.01); *G01J 3/4406* (2013.01)

(58) Field of Classification Search
CPC .......... G01J 3/0297; G01J 3/2803; G01J 3/28; G01J 3/443; G01J 3/02; G01J 3/44;
(Continued)

(56) References Cited

U.S. PATENT DOCUMENTS

| 5,379,065 A | * | 1/1995 | Cutts | ..................... G01J 3/1256 |
| | | | | 348/207.99 |
| 5,920,389 A | | 7/1999 | Bungo | |

(Continued)

FOREIGN PATENT DOCUMENTS

| CN | 101349591 A | 1/2009 |
| CN | 103163639 A | 6/2013 |

(Continued)

OTHER PUBLICATIONS http://www.vernier.com/files/manuals/vsp-em.pdf,—Jan. 2014.*
(Continued)

*Primary Examiner* — Mohamed K Amara
(74) *Attorney, Agent, or Firm* — Crowell & Moring LLP

(57) ABSTRACT

This invention relates to a system and method to improve the signal to noise ratio (SNR) of optical spectrometers that are limited by nonrandom or fixed pattern noise. A signal from a sample is collected using a short test exposure, a total observation time to maximize SNR is calculated, and the total observation time is achieved by averaging multiple exposures whose time is selected based on the time dependent noise structure of the detector. Moreover, with a priori knowledge of the time dependent noise structure of the spectrometer, this method is easily automatable and can maximize SNR for a spectrum of an unknown compound without any user input.

14 Claims, 4 Drawing Sheets

(51) Int. Cl.
*G01J 3/44* (2006.01)
*G01J 3/443* (2006.01)

(58) Field of Classification Search
CPC .......... G01J 3/4406; G01J 3/10; G01J 3/2823;
G01J 3/524; G01J 3/00; G01N 21/65;
G01N 21/274; G01N 21/645; G01N
21/658; G01N 21/31; G01N 21/6428;
G01N 2021/6421; A61B 5/0075; A61B
5/0059; A61B 5/0071; A61B 5/0084;
A61B 5/1455
See application file for complete search history.

(56) References Cited

U.S. PATENT DOCUMENTS

| | | | | |
|---|---|---|---|---|
| 6,256,057 | B1* | 7/2001 | Mathews | G01C 11/02 |
| | | | | 348/144 |
| 6,600,563 | B1* | 7/2003 | Bahatt | G01N 21/553 |
| | | | | 356/445 |
| 6,687,000 | B1* | 2/2004 | White | G01N 21/6408 |
| | | | | 356/300 |
| 6,831,688 | B2* | 12/2004 | Lareau | H04N 5/353 |
| | | | | 348/272 |
| 6,992,761 | B2* | 1/2006 | Modlin | G01N 21/6428 |
| | | | | 250/458.1 |
| 7,061,609 | B2* | 6/2006 | Cheng | G01J 3/02 |
| | | | | 356/326 |
| 7,605,918 | B2 | 10/2009 | Dalrymple | |
| 7,710,470 | B2* | 5/2010 | Kohashi | H04N 1/38 |
| | | | | 348/234 |
| 7,990,522 | B2* | 8/2011 | Sesko | G01J 3/0208 |
| | | | | 356/4.04 |
| 8,102,531 | B2* | 1/2012 | Abbink | G01J 1/04 |
| | | | | 356/432 |
| 8,243,150 | B2* | 8/2012 | Hitomi | G06T 5/50 |
| | | | | 348/208.6 |
| 8,553,210 | B2* | 10/2013 | Beckstead | G01J 3/28 |
| | | | | 356/73.1 |
| 9,052,290 | B2* | 6/2015 | Treado | G01N 33/22 |
| 9,261,404 | B2 | 2/2016 | Marbach et al. | |
| 9,900,521 | B2* | 2/2018 | Tanaka | H04N 5/232941 |
| 10,066,990 | B2* | 9/2018 | Rosen | G01J 3/36 |
| 2002/0193971 | A1* | 12/2002 | Whitsitt | G01S 3/781 |
| | | | | 702/189 |
| 2003/0007147 | A1* | 1/2003 | Johnson | G01J 3/02 |
| | | | | 356/326 |
| 2003/0044967 | A1* | 3/2003 | Heffelfinger | G01J 3/14 |
| | | | | 435/287.2 |
| 2007/0216900 | A1* | 9/2007 | Dalrymple | G01J 3/28 |
| | | | | 356/326 |
| 2009/0128802 | A1* | 5/2009 | Treado | G01J 3/02 |
| | | | | 356/73 |
| 2009/0152664 | A1* | 6/2009 | Klem | H01L 27/14603 |
| | | | | 257/440 |
| 2010/0020933 | A1* | 1/2010 | Topfer | G06T 5/50 |
| | | | | 378/98.11 |
| 2013/0146750 | A1 | 6/2013 | Maeda | |
| 2014/0268136 | A1* | 9/2014 | Pawluczyk | G01J 3/027 |
| | | | | 356/326 |
| 2016/0142700 | A1* | 5/2016 | Grover | H04N 13/025 |
| | | | | 348/47 |
| 2016/0227138 | A1* | 8/2016 | Kozlowski | H04N 5/35563 |
| 2016/0241791 | A1* | 8/2016 | Narayanswamy | G06T 15/00 |

FOREIGN PATENT DOCUMENTS

| | | |
|---|---|---|
| CN | 103925999 A | 7/2014 |
| JP | 2003-512085 A | 3/2000 |
| JP | 2009-145478 A | 7/2009 |
| JP | 2010-122356 A | 6/2010 |
| WO | WO 2000/015101 A1 | 3/2000 |
| WO | WO 2007/050602 A2 | 5/2007 |
| WO | WO 2014/078426 A1 | 5/2014 |

OTHER PUBLICATIONS https://www.edinst.com/wp-content/uploads/2015/09/LP980-Brochure-Low-Res-for-download.pdf -2014-.*
https://www.andor.com/learning-academy/read-noise-understanding-scmos-read-noise.*
https://en.wikipedia.org/wiki/Shot_noise.*

* cited by examiner

SYSTEM AND METHOD TO MINIMIZE NONRANDOM FIXED PATTERN NOISE IN SPECTROMETERS

CROSS REFERENCE TO RELATED APPLICATION

This application claims the benefit of U.S. provisional application No. 62/106,970 filed on Jan. 23, 2015, which is herein incorporated by reference in its entirety.

BACKGROUND

1. Field of the Invention

The present invention generally relates to an automatable system and method to minimize nonrandom noise in spectrometers, and more specifically to optical spectrometers.

2. Description of Related Art

One major challenge for spectrometer manufacturers is providing customers with tools to automatically maximize signal to noise ratio for measurements of unknown samples. Handheld instruments often face a set of unique challenges when dealing with nonrandom sources of noise that cannot be minimized by lengthening a single exposure in the same way that Johnson-Nyquist and/or shot noise is minimized.

U.S. Pat. No. 7,605,918 describes an auto exposure routine for Raman spectrometers where an operator can "specify a target signal to noise ratio (SNR) to be attained when collecting spectra from a sample" by performing a brief test pulse to estimate the maximum exposure length that will not saturate the detector. In U.S. Pat. No. 7,605,918, if the operator specified SNR requires an observation time that would saturate the detector with a single exposure, multiple exposures are automatically collected and subsequently summed or averaged. U.S. Pat. No. 7,605,918 specifically states that "If the desired SNR is less than the SNR of an exposure using the maximum exposure time, then only a single exposure is needed, and the exposure time can be scaled using the SNR from the single brief sample exposure to achieve a SNR which at least approximates the one desired."

SUMMARY

The system and method described in this application is significantly different than U.S. Pat. No. 7,605,918 in both objective and approach. The objective of U.S. Pat. No. 7,605,918 is to sum or average multiple in order to achieve observation times that would otherwise saturate the detector. In contrast, the objective of the method described in this application is to use multiple exposures of predetermined time to minimize nonrandom not that cannot be minimized by lengthening single exposures.

The approach described in U.S. Pat. No. 7,605,918 sums or averages multiple scans only if the detector would be otherwise saturated. Using this approach, the time necessary to saturate the detector is dependent on the signal intensity resulting from analysis of the sample. Therefore this maximum exposure time can change from sample to sample. In contrast, for the method described in this application, the exposure time is a predefined length of time that is selected based on the noise characteristics of the particular system, is set at the time of manufacture, and is independent of the sample. This noise based approach is uniquely useful for detection systems that are limited by nonrandom noise, which unlike random thermal or shot noise, the magnitude of which does not average out over long single exposures, and often times grows as exposures lengthen. The approach described in U.S. Pat. No. 7,605,918 would therefore not be useful for minimizing nonrandom noise in optical spectrometers. Conversely, the spectrometers that benefit from the approach described in U.S. Pat. No. 7,605,918 would likely not benefit from the method described here because they are likely shot noise or detector noise limited, and unnecessarily adding additional spectra to average would introduce additional readout noise, thus increasing the overall noise of the detection system.

This invention general relates to an automated method and system to maximize SNR in spectrometers that are limited by nonrandom noise. In this method, a signal from a sample is collected using a short test exposure, a total observation time to maximize SNR is calculated, and the total observation time is achieved by averaging multiple exposures whose time is selected based on the time dependent noise structure of the system. By selecting an exposure time based on the time dependent noise structure of the detector, nonrandom noise can be minimized in ways that cannot be achieved using a single exposure. Moreover, with a priori knowledge of the time dependent noise structure of the spectrometer, this method may be automatable and requires no input from the end user.

Further objects, features and advantages of this invention will become readily apparent to persons skilled in the art after a review of the following description, with reference to the drawings and claims that are appended to and form a part of this specification.

DETAILED DESCRIPTION

Figure 1:
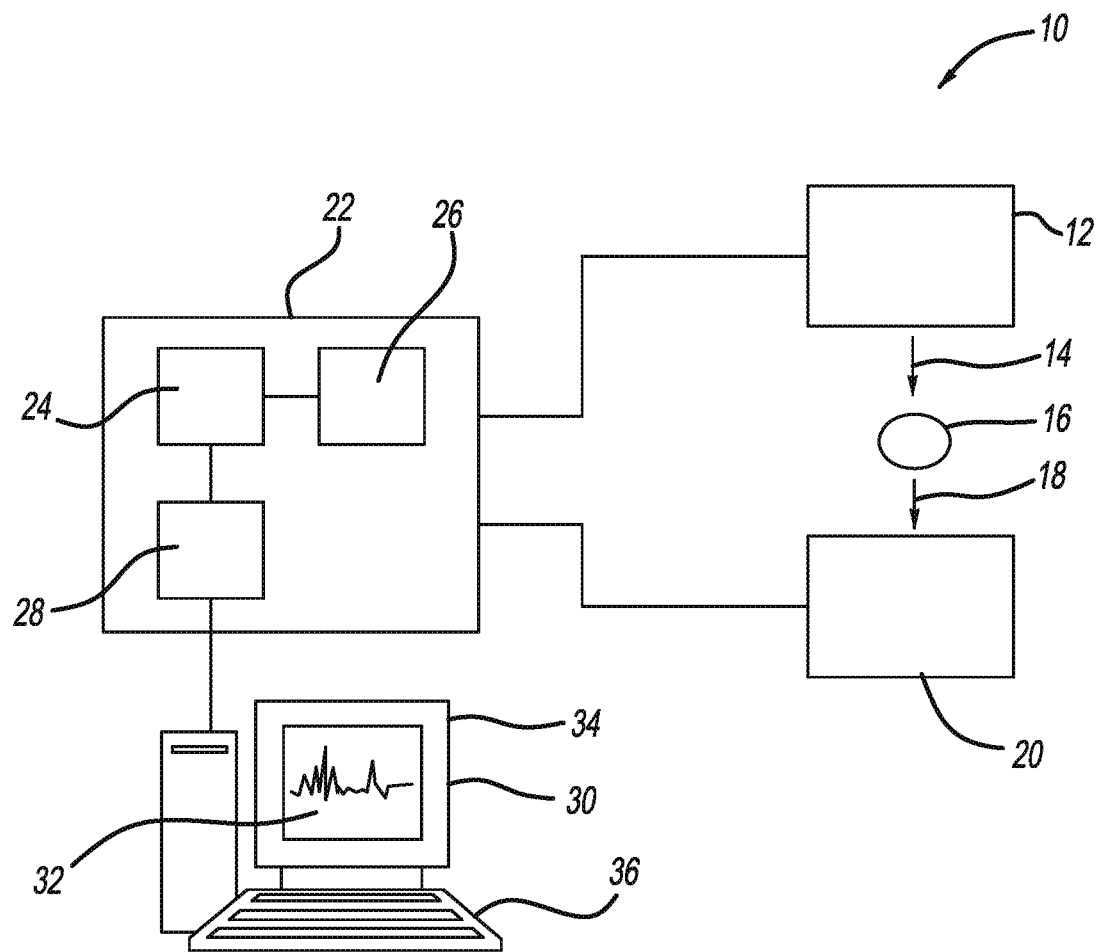
FIG. 1 is a block diagram of a system to minimize nonrandom electronic noise.

One objective of the system and method described here is to minimize nonrandom noise that can limit the performance of an optical spectrometer. All types of nonrandom noise can be minimized using the method described herein, for example including flicker noise, $1/f$ noise, $1/f^2$ noise, or noise tied to variations in pixel sensitivity in a detector array. The nonrandom noise can originate from any component that is part of, attached to, or otherwise influences subsystems of the spectrometer. Electronic subsystems of the spectrometer include for example: individual sensor pixels in a detector array, preamplification electronics found inside and/or outside the detector module, readout electronics found inside and/or outside the detector module, electronic components associated with data transfer, power components, instrument control/data viewing components, and all associated wiring.

Any optical spectroscopic technique can be used as part of the detection system, such as any of those known in the art. In brief, optical spectrometers position an optical beam in such a way that the optical beam interacts with the sample, and a change in optical signal is measured using a detector. Any appropriate light source that produces any wavelength of light may be used, for example including, lasers, photodiodes, x-ray tubes, and blackbody radiators. Additionally, any appropriate detector material may be used, for example including indium gallium arsenide (InGaAs), Silicon, Germanium, Mercury Cadmium Telluride, Indium antimonide. The detector may be comprised of a single detector, a linear array of detector elements or a 2 dimension array of detector elements.

Raman spectroscopy is a technique that measures a characteristic shift from a laser source caused by inelastic light scattering of a sample. Raman spectroscopy gives a high level of molecular structure information of a sample complimentary to Infrared (IR) Spectroscopy, but has advantages to IR Spectroscopy in some cases, one of which is that water present in the sample does not interfere with analysis by Raman.

IR spectroscopy is the absorption measurement of different IR frequencies by a sample positioned in the path of an IR beam. The main goal of IR spectroscopic analysis is to determine the chemical functional groups found in the sample. IR spectra are obtained by detecting changes in transmittance or absorption intensity as a function of frequency.

Fluorescence spectroscopy measures the emission of light after a sample has absorbed light of a different frequency. Fluorescence is typically used in the UV or visible region of the electromagnetic spectrum, but other types of fluorescence (e.g., X-Ray) can also be used for some applications. Fluorescence instruments for the UV and visible regions of the electromagnetic spectrum can be compact, low power and transportable where needed.

UV or visible spectroscopy is the absorption measurement of different UV or visible wavelengths of light by a sample positioned in the path of a UV or visible beam. UV or visible spectroscopy measures the light change by a sample due to an electronic transition in the probed material. Some UV or visible spectrometers are compact, low power and can be transported where needed.

Emission spectroscopy is the measurement of light that is emitted from a sample, rather than absorbed by a sample. The emission of light can be produced in any way, for example including: excitation from a laser (Laser Induced Breakdown Spectroscopy—LIBS) or excitation from inductively coupled plasma (ICP).

Those skilled in the art will see numerous applications for the above mentioned embodiments, particularly those where electronic noise is the limiting source of noise for the system.

As an example, FIG. 1 illustrates a system 10 to minimize nonrandom electronic noise. As stated before, the system 10 may be any one of a number of different spectroscopy systems mentioned in the paragraphs above. As its basic components, the system 10 includes a source 12 configured to emit electromagnetic radiation 14 for an exposure to a sample 16 under investigation. At least a portion 18 of the electromagnetic radiation 14 that was provided to the sample 16 is received by a detector 20. The source 12 and detector 20 may be any one of a number of different sources or detectors. For example, the source 12 may be a 1064 nm laser, while the detector may be an InGaAs detector used to measure a Raman spectrum. The detector 20 is configured to output a signal based on the exposure of electromagnetic radiation received by the detector 20.

A control system 22 may be in communication with both the source 12 and/or detector 22. As its primary components, the control system 22 may include a processor being in communication with a memory unit 26. The memory unit 26 may contain instructions to configure the processor 24 to execute any one of a number of different methods disclosed in this specification. It should also be understood that the processor 24 may be more than one processor. Additionally, the memory 26 may be located separate from the processor 24, as shown, or may be embedded within the processor 24. The control system 22 is configured to control the exposure of electromagnetic radiation from the source 12 and receive and interpret signals from the detector 20.

Further, the source 12 may be configured by the control system 22 to emit electromagnetic radiation 14 for a pre-defined length of time for the exposure. The pre-defined length of time is based on the noise characteristics of the system 10 to minimize nonrandom electronic noise.

Further, the control system 22 may include an output device 28 allowing the control system 22 to communicate with external devices such as a general purpose computer 30. It should also be understood that the control system 22 and general purpose computer 30 may be integrated into a single unit. The control system 22 may be configured to output a signal of a waveform 32 to the general purpose computer 30. The general purpose computer 30 may include an output device 34 capable of displaying the waveform 32. Further, the general purpose computer 30 may also include any one of a number of different input devices 36, such as a keyboard or mouse to allow a user of the general purpose computer 30 to better view and interpret the waveform 32.

Additionally or alternatively, the source 12 may be configured by the control system 22 to emit a test exposure of electromagnetic radiation to be received by the detector 20. The control system 22 may then be configured to calculate the pre-defined length of time based on the test exposure received by the detector. The pre-defined length of time may be calculated based on the ratio of signal to noise to exposure time of the system 10.

As such, the invention may also be a method including the steps of emitting a plurality of exposures of electromagnetic radiation from the source 12, wherein a time for each exposure of the plurality of exposures is a pre-defined length of time. The pre-defined length of time may be based on noise characteristics of the spectroscopy system 10 to minimize nonrandom electronic noise. The method may further include the steps of receiving by the detector 20 at least a portion of electromagnetic radiation from the source 12 for each exposure and then calculating a wave form by averaging the plurality of exposures received by the detector.

Figure 2:
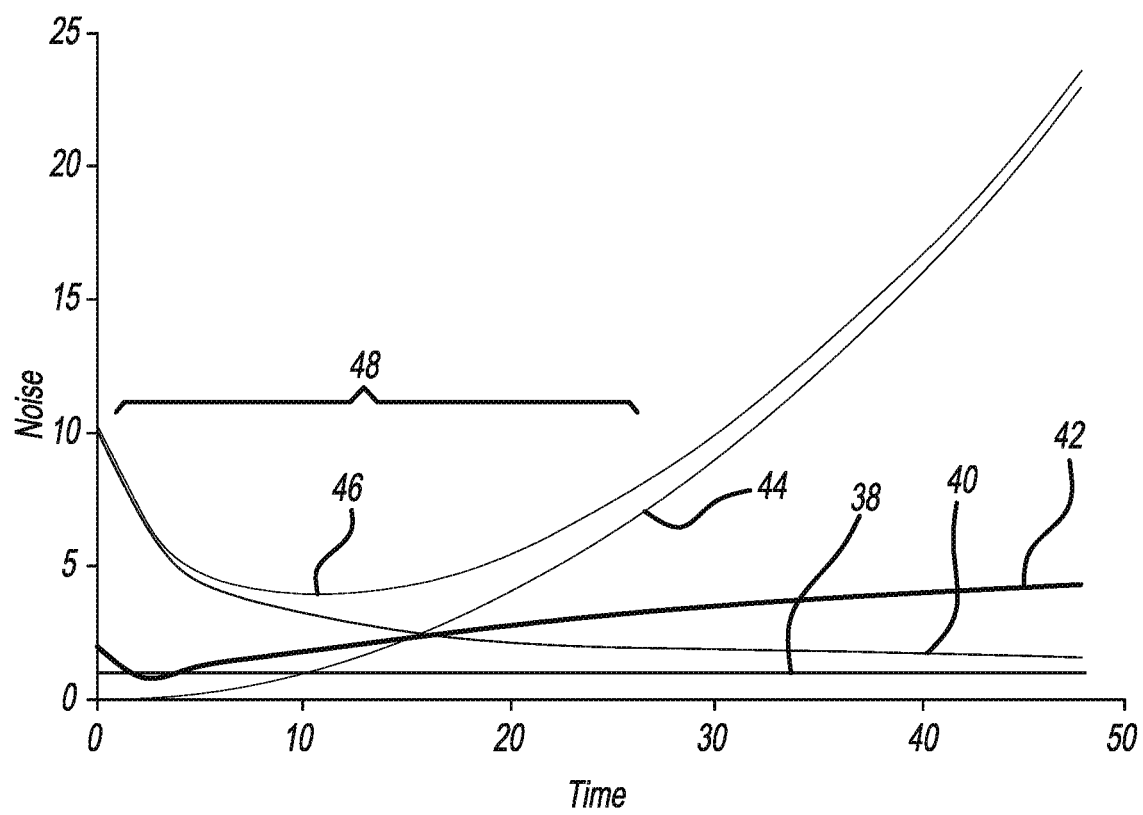
FIG. 2 illustrates a chart of different contributors to noise as it relates to time.
Figure 3:
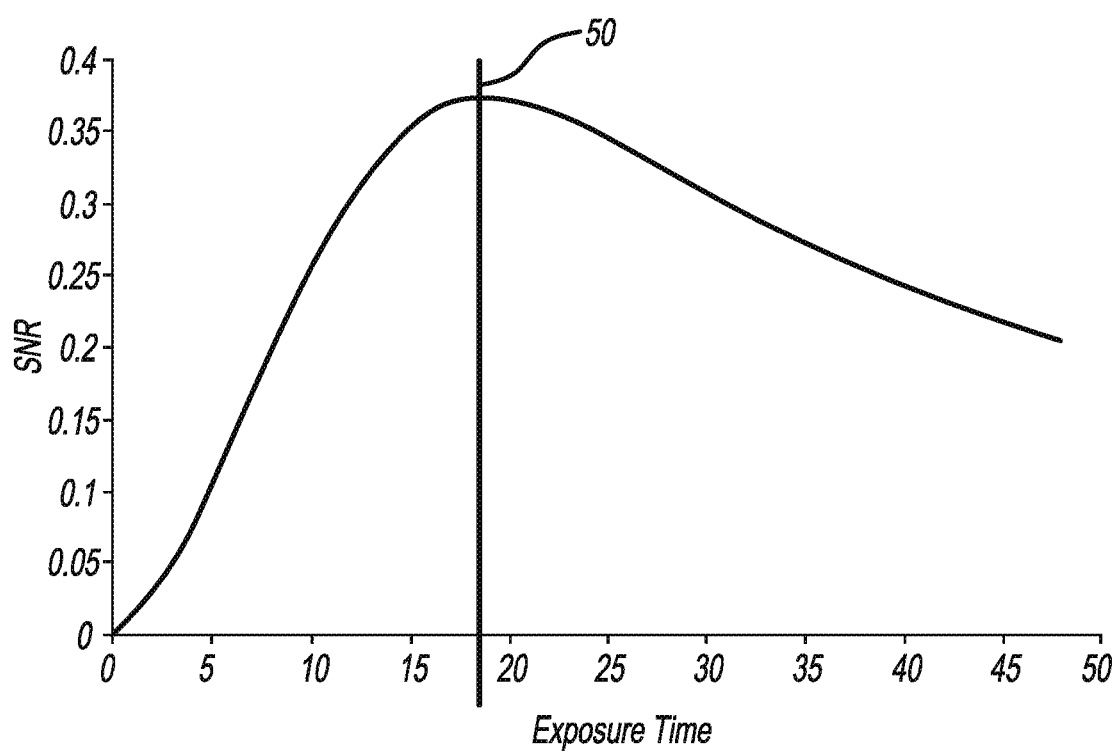
FIG. 3 illustrates a chart showing the signal to noise ratio as it relates to exposure time.

In order to better understand how the pre-defined length of time is determined for the length of each exposure, reference is made to FIGS. 2 and 3. It should be understood that the illustration of the charts shown in FIGS. 2 and 3 are just examples but do generally show the noise characteristics of an optical spectroscopy system.

FIG. 2 illustrates four different examples of noise contributors to an optical spectroscopy system. Here, the noise contributors can include a read noise 38, a detector noise 40, a shot noise 42, and an electronic noise 44. Generally, the read noise 38 is fixed for each exposure. Detector noise 40 is generally random and generally minimizes itself as the time for the exposure is lengthened. Shot noise 42 is also generally a random noise that should minimize but depending on the amount of light coming into the system 10 it can actually grow with time. Finally, as to nonrandom fixed pattern noise 44, as the length of the exposure time is increased, electronic noise 44 increases as well. The sum of noises 38, 40, 42, and 44 are shown by line 46. As illustrated, line 46 shows a well 48 in the total sum of noise wherein there is a period of exposure time where the amount of noise is relatively low.

FIG. 3 illustrates the signal to noise ratio as it relates to exposure time. As seen in FIG. 3, there is a maximum signal to noise ratio to exposure time as indicated by line 50. The predetermined length of time for the exposure is based on an analysis of the signal to noise ratio to exposure time and essentially the exposure time should be determined by calculating an exposure time that includes the maximum signal to noise ratio as indicated by line 50. The predetermined time for individual exposures was selected by optimizing the signal to noise ratio as a function of exposure time. This optimization can be done experimentally, or by modeling the relative contribution of each noise source of the detection system to arrive at the ideal exposure time.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Figure 4:
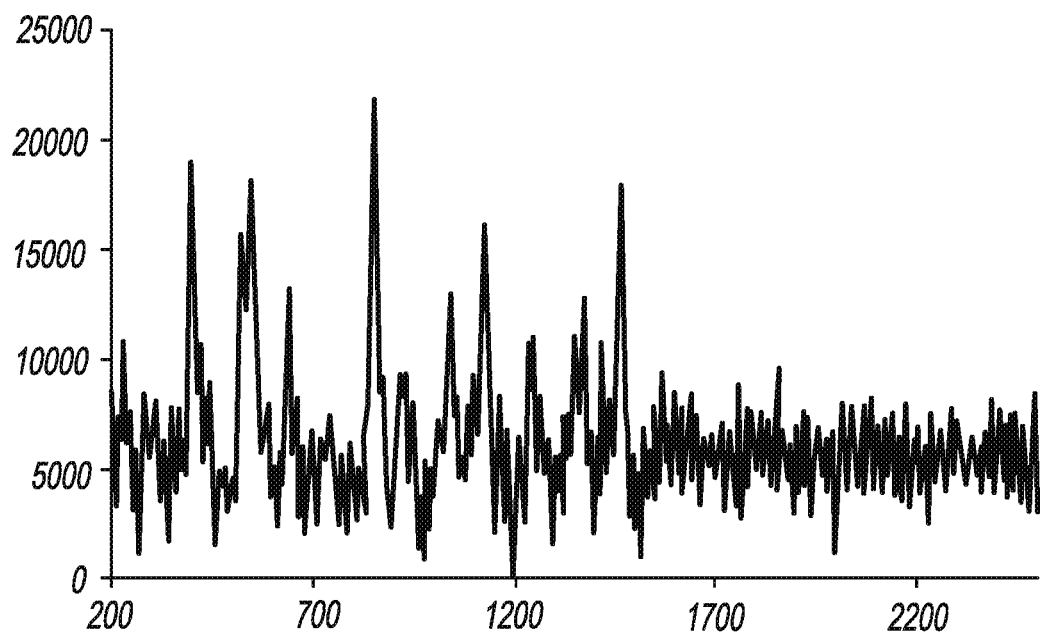
FIG. 4 illustrates an example waveform generated by a prior art system.
Figure 5:
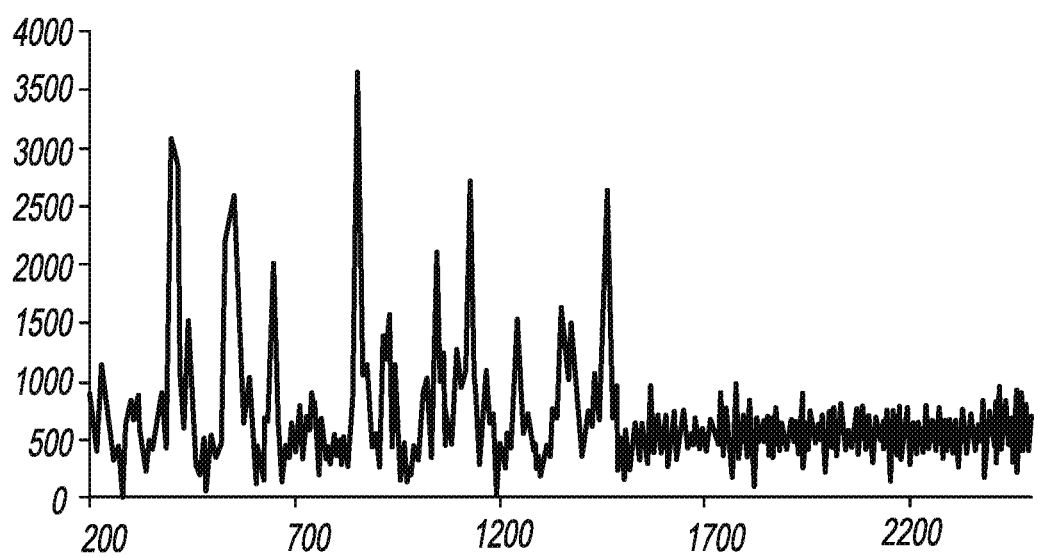
FIG. 5 illustrates a waveform taken by a system incorporating methods to minimize nonrandom electronic noise.

The advantages produced by the invention can be shown in the embodiment where a dispersive handheld Raman spectrometer, comprised of a 1064 nm excitation laser and an InGaAs detector is used to measure a Raman spectrum of sugar. In this particular embodiment, the Raman spectrum was collected using a traditional autoexposure routine, where a single 14 second exposure produces the Raman Spectrum shown in FIG. 4. A Raman spectrum of the same sample, shown in FIG. 5 was collected using the method described in this advantage, where the same 14 second observation time is achieved by averaging 7 exposures of 2 seconds each. The two second length of time for the individual exposures was chosen based on the time dependent noise structure of the particular spectrometer system. The SNR (calculated by measuring the height of the peak near 825 cm$^{-1}$, divided by the peak-to-peak noise of the region near 2000 cm$^{-1}$) of the spectrum shown in FIG. 4 is roughly 4:1, while the SNR (calculated in the same way) of the spectrum shown in FIG. 5 is roughly 10:1 for the same total observation time. In this particular example, a roughly 2.5 fold improvement in SNR was achieved by using the methodology described in this invention for a given observation time.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A handheld spectroscopy to minimize nonrandom electronic noise, the system comprising: a source configured to emit electromagnetic radiation for an exposure of multiple exposures, wherein each of the multiple exposures are each for a predetermined length time; a detector configured to receive at least a portion of the electromagnetic radiation from the source, wherein the detector is configured to output a signal based on the multiple exposures of electromagnetic radiation received by the detector for the exposure; a control system in communication with both the source and detector, wherein the control system is programmed to control the exposure of electromagnetic radiation from the source and receive and interpret signals from the detector; wherein the source is configured by the control system to emit electromagnetic radiation for the predefined length of time for each of the multiple exposures, wherein the predefined length of time is based on time dependent noise characteristics to minimize nonrandom electronic noise and is the same for each of the multiple exposures; wherein the control system is programmed to output a waveform by averaging each signal associated with each of the multiple exposures based on signals received from the detector, each of the multiple exposures have a duration equal to the predetermined length of time; wherein the predefined length of time is calculated based on the ratio of signal-to-noise to exposure time of the system, wherein the predefined length of time is the length of time where the signal-to-noise ratio is substantially at a maximum and is calculated by averaging multiple exposures whose time is selected based on the time dependent noise characteristics of the system; and wherein the noise of the ratio of signal-to-noise is a sum of a read noise, a detector noise, a shot noise, and an electronic noise.

2. The system of claim 1, wherein:
the source is configured by the control system to emit a test exposure of electromagnetic radiation to be received by the detector; and
the control system being configured to calculate the predefined length of time based on the test exposure received by the detector.

3. The system of claim 1, wherein the predefined length of time is set at the time of manufacture of the system.

4. The system of claim 1, wherein the system is a Raman spectrometer.

5. The system of claim 1, wherein the system is a Fluorescence spectrometer.

6. The system of claim 1, wherein the system is a ultra-violet or visible spectrometer.

7. The system of claim 1, wherein the system is an emission spectrometer.

8. A method to minimize nonrandom electronic noise for a handheld spectroscopy system having a source and detector, the method comprising the steps of:
emitting a plurality of exposures of electromagnetic radiation from the source, wherein a time for each exposure of the plurality of exposures is a predefined length of time, wherein each of the multiple exposures are equal in duration for the predetermined length of time, wherein the predefined length of time is based on time dependent noise characteristics of the spectroscopy system to minimize nonrandom electronic noise;

receiving by the detector at least a portion of the electromagnetic radiation from the source for each exposure;

calculating a waveform by averaging each signal associated with each of the plurality exposures received by the detector, whether each of the plurality of exposures have a duration equal to the predefined length of time;

wherein the predefined length of time is calculated based on the ratio of signal-to-noise to exposure time of the spectroscopy system, wherein the predefined length of time is the predefined length of time where the signal-to-noise ratio is substantially at a maximum and is calculated by averaging multiple exposures whose time is selected based on the time dependent noise characteristics of the system; and wherein the noise of the ratio of signal-to-noise is a sum of a read noise, a detector noise, a shot noise, and an electronic noise.

9. The method of claim 8, further comprising the steps of:

emitting a test exposure of electromagnetic radiation to be received by the detector; and calculating the predefined length of time based on the test exposure received by the detector.

10. The method of claim 8, wherein the predefined length of time is set at the time of manufacture of the system.

11. The method of claim 8, wherein the system is a Raman spectrometer.

12. The method of claim 8, wherein the system is a Fluorescence spectrometer.

13. The method of claim 8, wherein the system is a ultra-violet or visible spectrometer.

14. The method of claim 8, wherein the system is an emission spectrometer.

* * * * *